United States Patent [19]

Narita et al.

[11] Patent Number: 5,895,155
[45] Date of Patent: Apr. 20, 1999

[54] PRINTER BUFFER UNIT

[75] Inventors: Izumi Narita, Koganei; Akihisa Kusano; Yuzo Seino, both of Kawasaki; Kaoru Sato; Tatsuto Tachibana, both of Yokohama; Tomohiro Nakamori, Machida, all of Japan

[73] Assignee: Canon Kabushiki Kaisha, Tokyo, Japan

[21] Appl. No.: 08/449,710

[22] Filed: May 24, 1995

Related U.S. Application Data

[62] Division of application No. 08/281,666, Jul. 28, 1994, which is a continuation of application No. 08/111,585, Aug. 25, 1993, abandoned, which is a continuation of application No. 07/797,195, Nov. 25, 1991, abandoned.

[30] Foreign Application Priority Data

Nov. 27, 1990 [JP] Japan .................. 2-324053

[51] Int. Cl.⁶ .................................................. B41J 3/42
[52] U.S. Cl. ............................ 400/61; 400/70; 395/114
[58] Field of Search .............................. 400/61, 70, 71, 400/74, 76; 395/112, 113, 114

[56] References Cited

U.S. PATENT DOCUMENTS

| | | |
|---|---|---|
| 4,630,198 | 12/1986 | I-Yuan .................. 364/200 |
| 5,293,466 | 3/1994 | Bringmann .................. 395/114 |
| 5,299,296 | 3/1994 | Padalino et al. .................. 395/112 |
| 5,327,526 | 7/1994 | Nomura et al. .................. 395/115 |

FOREIGN PATENT DOCUMENTS

| | | | |
|---|---|---|---|
| 0123806 | 11/1984 | European Pat. Off. .............. 400/61 |
| 63-060870 | 3/1988 | Japan .................. 400/61 |
| 163920 | 7/1988 | Japan .................. 400/74 |
| 2048363 | 2/1990 | Japan .................. 400/61 |
| 2099377 | 4/1990 | Japan .................. 400/61 |

OTHER PUBLICATIONS

Bostwick, "Software Drivers Control Printers", *Mini–Micro Systems*, vol. 19, No. 3, pp. 11–18, Feb. 1986.

Maholick, et al., "Checkpointing for Printer Restart", *IBM Technical Disclosure Bulletin*, vol. 24, No. 3, pp. 1429–1431, Aug. 1981.

"Printer Data Stream Method to Allow Dynamic Stream Switching", *IBM Technical Disclosure Bulletin*, vol. 33, No. 1B, pp. 126–130, Jun. 1990.

*Primary Examiner*—John Hilten
*Attorney, Agent, or Firm*—Fitzpatrick, Cella, Harper & Scinto

[57] ABSTRACT

A printer buffer unit is connectable to one or a plurality of host computers and one or a plurality of printers. The printer buffer unit has a unit for detecting a break of print job data sent from a host computer, and a unit for adding a job offset command at the time of the break in sending the print job data to a printer.

18 Claims, 6 Drawing Sheets

PRINTER BUFFER UNIT

This application is a division of application Ser. No. 08/281,666 filed Jul. 28, 1994, which is a continuation of application Ser. No. 08/111,585 filed Aug. 25, 1993, abandoned, which is a continuation of application Ser. No. 07/797,195 filed Nov. 25, 1991, abandoned.

BACKGROUND OF THE INVENTION

1. Field of the Invention

The present invention relates to a printer buffer unit used in a system having one or a plurality of host computers which share one or a plurality of printers.

2. Related Background Art

Conventionally, in sharing one or a plurality of printers by one or a plurality of host computers, a printer buffer unit operates simply to send data from a host computer to a printer to sequentially print the data.

If a print job of a host computer has been completed and the next print job occurs, documents for the next print jobs are ejected onto the documents for the present print job. Therefore, there arises a problem that it takes time to discriminate between documents of different jobs.

Furthermore documents for different print jobs outputted from a plurality of host computers are ejected as to be superposed one upon another on the eject tray of the same printer Therefore it arises a problem that it takes time to discriminate between documents of print jobs from different host computers.

Still further, if an error such as no printing sheet, jamming, or the like occurs at a printer under operation and it becomes impossible to continue the print-out operation, there arises a problem that the print job cannot be terminated unless such an error is informed to the host computer and a printer error recovery operation is carried out manually by the operator.

Furthermore, if a plurality of printers are connected to a printer buffer unit and the sizes of printing sheets or the like for the printers are different, a host computer is required to check the printers connected to the printer buffer unit and select a suitable one

SUMMARY OF THE INVENTION

It is an object of the invention to provide a printer buffer unit capable of allowing easy discrimination between ejected documents of different print jobs.

According to a pointer buffer unit of the present invention, different print jobs for each host computer or computers are discriminated, and a job offset command is issued to the printer at the break of each print job. Accordingly, without increasing a burden on a host computer, printing sheets for each print job or host computer can be ejected out to a different position, allowing easy discrimination between different documents.

It is another object of the present invention to provide a printer buffer unit excellent in operation and capable of performing a mode selection or the like for proper printing without complicated manipulations.

According to a printer buffer unit of the present inventions if an error occurs at a particular printer among a plurality of printers, another printer is automatically selected and used.

According to a printer buffer unit of the present invention, the type of printers is automatically checked to select a suitable printer for a particular printer job of a host computer.

Since the printer buffer unit can monitor the status of a plurality of printers, when an error occurs at a printer, it is possible to automatically change to another printer and not to interrupt the print jobs without increasing a burden on a host computer. Still further, it is possible to print out print data by automatically selecting a printer suitable for the conditions requested by the host computer.

The other objects, advantages, and effects of the present invention will become more apparent from the following detailed description and appended claims when read in conjunction with the accompanying drawings.

DETAILED DESCRIPTION OF THE PREFERRED EMBODIMENTS

Preferred embodiments of the present invention will be described with reference to the accompanying drawings.

Figure 1:
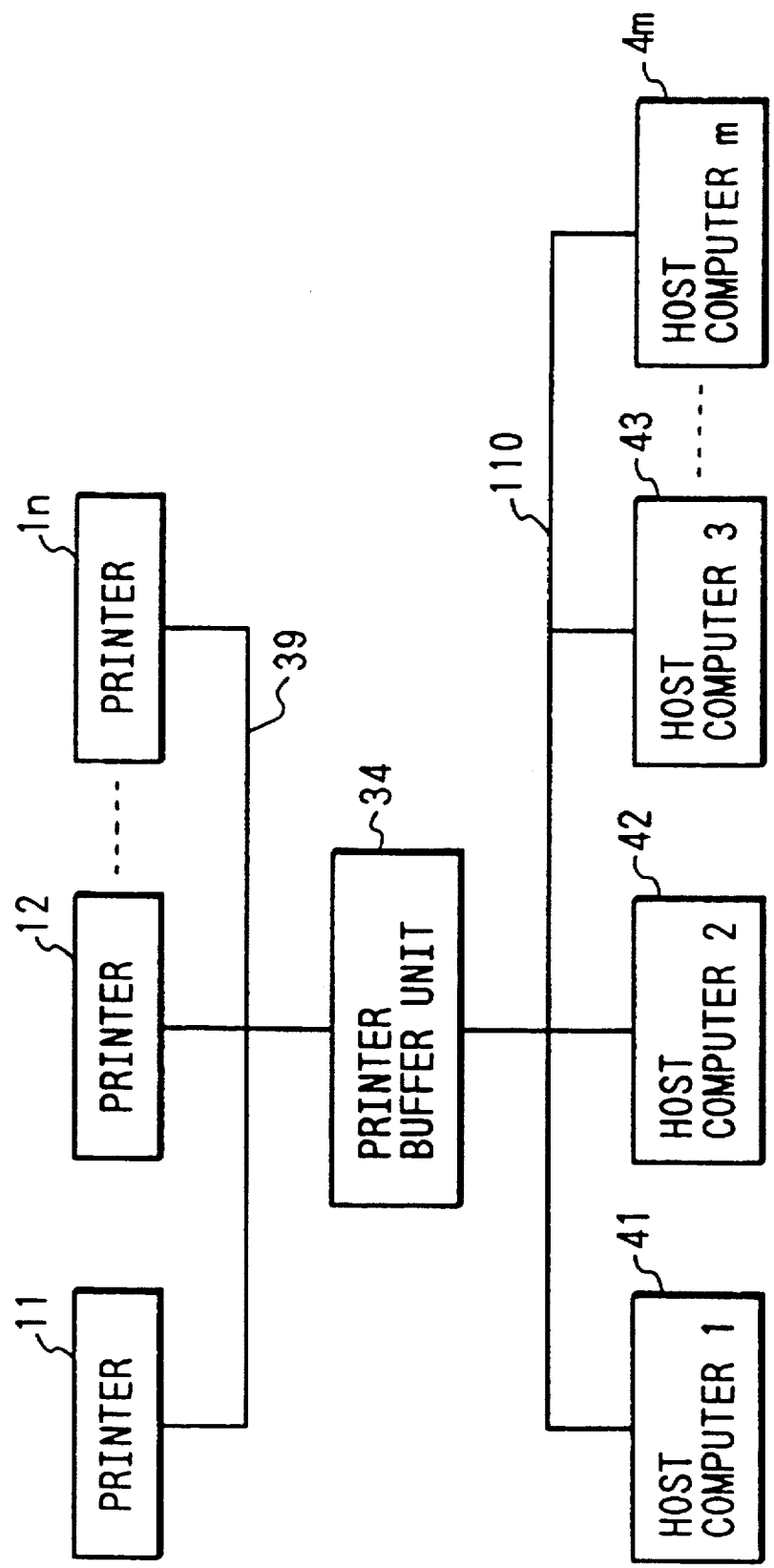
FIG. 1 is a block diagram showing the system arrangement of a printer buffer unit according to an embodiment of the present invention.

FIG. 1 is a block diagram showing the system arrangement of a printer buffer unit according to an embodiment of the present invention The printer buffer unit 34 of this embodiment is connected via a printer interface line 39 to $\underline{n}$ printers $1\mathit{l}$ to $1n$, and via a host interface line 110 to $\underline{m}$ host computers $4\mathit{l}$ to $4m$.

Figure 2:
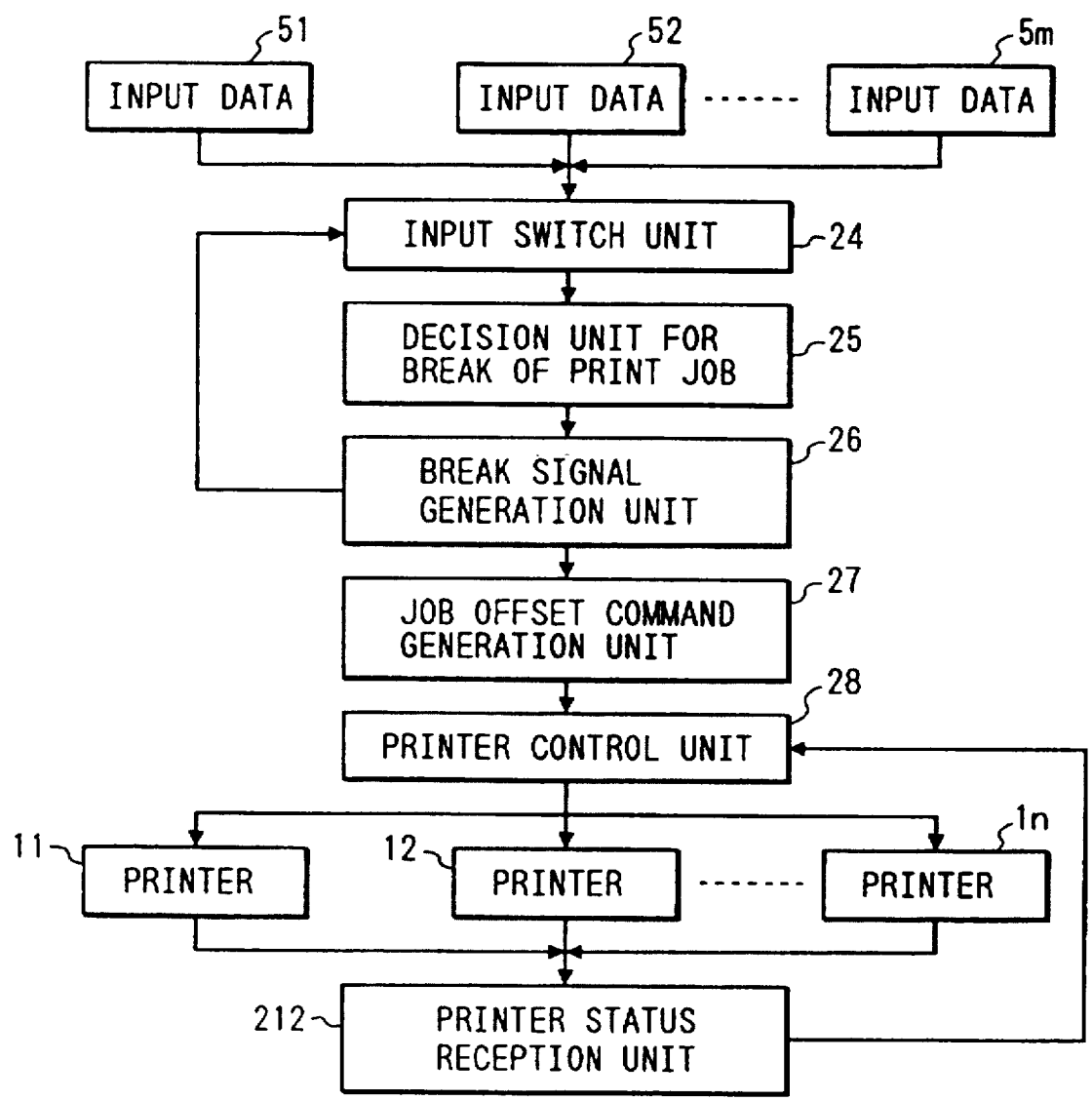
FIG. 2 is a block diagram illustrating the outline of the procedure to be executed by the printer buffer unit of the embodiment.

FIG. 2 is a block diagram of a detailed system arrangement illustrating the outline of the procedure to be executed by the printer buffer unit 34.

Input data $5\mathit{l}$ to $5m$ is supplied from the corresponding host computers $4\mathit{l}$ to $4m$.

As data processing units, there are provided an input switch unit 24 for selecting one of the input data $5\mathit{l}$ to $5m$ from the host computers $4\mathit{l}$ to $4m$, a decision unit 25 for deciding a break of print job, a break signal generation unit 26 for generating a print job break signal, a command generation unit 27 for generating a job offset command, a printer control unit 28 for controlling the printers $1\mathit{l}$ to $1n$, and a printer status reception unit 212 for receiving status information such as printer error from the printers $1\mathit{l}$ to $1n$.

In the printer buffer unit constructed as above, one of the input data $5\mathit{l}$ to $5m$ is selected by the input switch unit 24.

The decision unit 25 monitors a break of print job of the selected printer Until the break signal generation unit 26 generates a break signal and instructs the input switch unit 24 in response to the decision result of the decision unit 25, the input switch unit 24 will not accept another input data.

A job offset command is issued by the command generation unit 27 to the selected printer.

The status of the selected printer is monitored by the status reception unit 212. If a print error or the like occurs its status is notified to the printer control unit 28.

Figure 3:
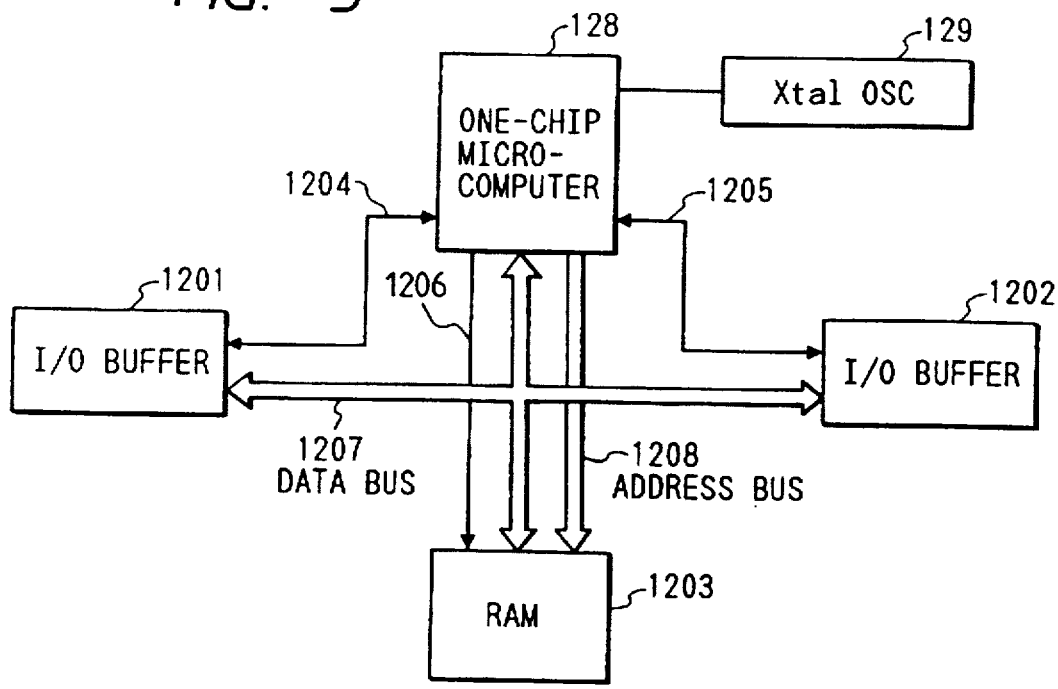
FIG. 3 is a circuit diagram showing an example of the hardware arrangement of the printer buffer unit of the embodiment.

FIG. 3 is a circuit diagram showing an example of the hardware arrangement of the printer buffer unit 34.

The printer buffer unit 34 has a one-chip microcomputer 128 for controlling the whole system of the printer buffer unit 34, a crystal oscillator 129 for supplying clock pulses to the one-chip microcomputer 128, an I/O buffer 1201 for interface with the host computers, another I/O buffer 1202 for interface with the printers, a RAM 1203 for temporarily storing print data, a data bus 1207, and an address bus 1208.

The one-chip microcomputer 128 outputs a host interface control signal 1204, a printer interface 1control signal 1205, a RAM control signal 1206, and so on.

In the printer buffer unit 34 having the above-described structure, print data inputted from an interface of a host computer in the buffer 1201 is stored in RAM 1203 in response to the control signal 1204 from the one-chip microcomputer 128.

At the same time, a job offset command is issued from the one-chip microcomputer 128 to a printer via the buffer 1202 Then, the data in RAM 1203 is sent via the buffer 1202 to the printer in response to the control signal 1206.

Figure 4:
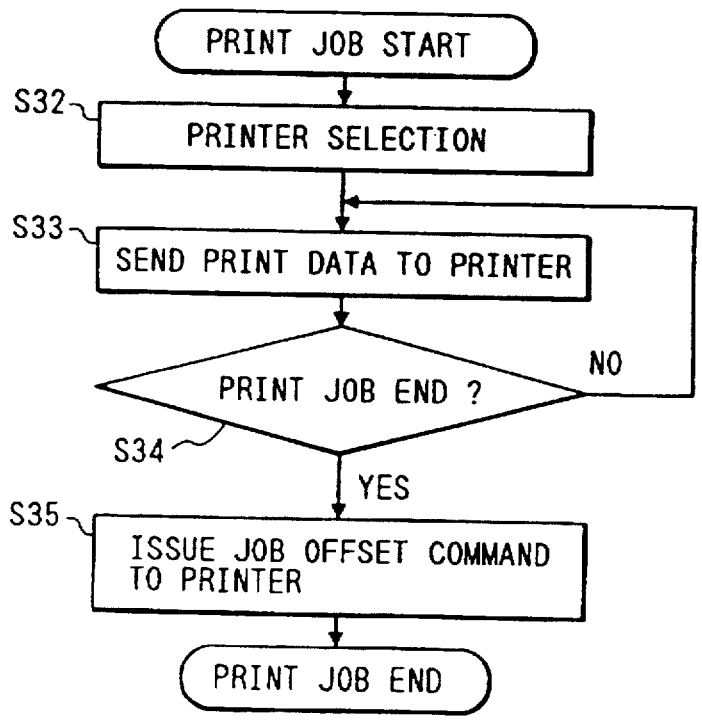
FIG. 4 is a flow chart showing a first example of the control operation of the embodiment.

An example of a control operation program of the one-chip microcomputer 128 will be described FIG. 4 is a flow chart showing a first example of the control operation wherein a job offset command is issued to a printer each time a print job is changed so that printing sheets for each print job are ejected to a different position.

First, when print data is sent from a host computer to the print buffer unite a print job starts.

One of the printers connected to the printer buffer unit is selected (step S32) to start sending print data to the selected printer (step S33).

It is checked if the print job has been completed (step S34). Assuming that interface between the host computer and the printer buffer unit is performed using SCSI, the end of a print job is detected while monitoring the phase transition of SCSI. Specifically, the printer buffer unit determines as an end of a print job when a data-out phase during which print data is sent from the host computer transits to another phase such as a message phase.

If print data continues to be sent from the host computer, the print data is maintained to be sent. If the print job end is detected, a job offset command is issued to the printer (step S35) which in turn performs an offset operation. With the above procedure, the print sheet eject position of the next print job can be made different from that of the present print job.

Figure 5:
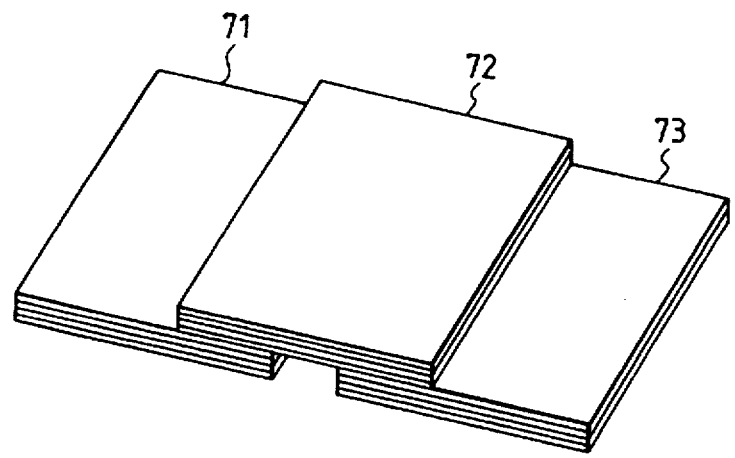
FIG. 5 is a schematic diagram showing the printing sheet eject state when an offset command is executed in the first control operation.

FIG. 5 is a schematic diagram showing an example of the state of printing sheet eject when such an offset command is executed. As shown in FIG. 5, three documents 71 to 73 for three print jobs are ejected to three different positions, enabling to readily discriminate between three documents of respective print jobs.

Figure 6:
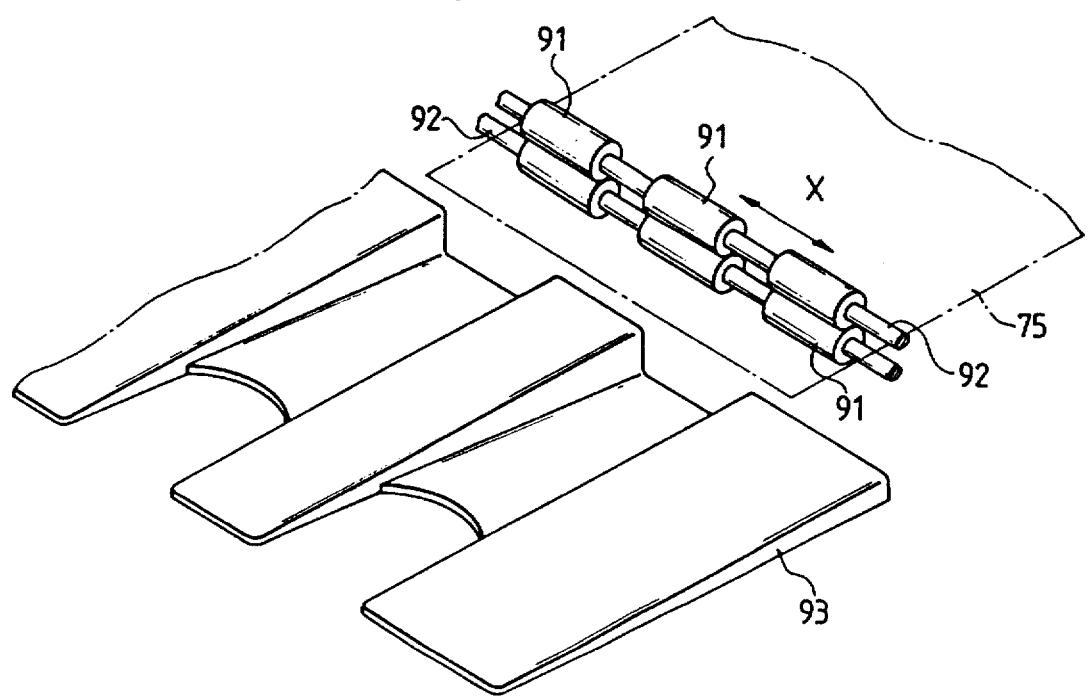
FIG. 6 is a perspective view showing the outline of an eject unit with a function to offset a printing sheet eject position in the first control operation.

FIG. 6 is a perspective view showing the outline of an eject unit having a function to offset the position of a printing sheet.

In this embodiment, in order to offset the position of a printing sheet 75, eject rollers 91 are moved in the axial direction (in X direction indicated by an arrow) while squeezing the sheet 75 after it reaches the rollers 91.

In the above manner, the eject position of the printing sheet 75 is changed, and the offset eject state such as shown in FIG. 5 can be obtained.

The eject rollers 91 and their drive shafts 92 may be moved by using a shift mechanism (not shown) driven by a motor or the like. The steps of shift amount may be set to multi-levels so that multi-level offset eject positions can be obtained.

An eject tray 93 is made wide so as to match the offset eject of a printing sheet.

Figure 7:
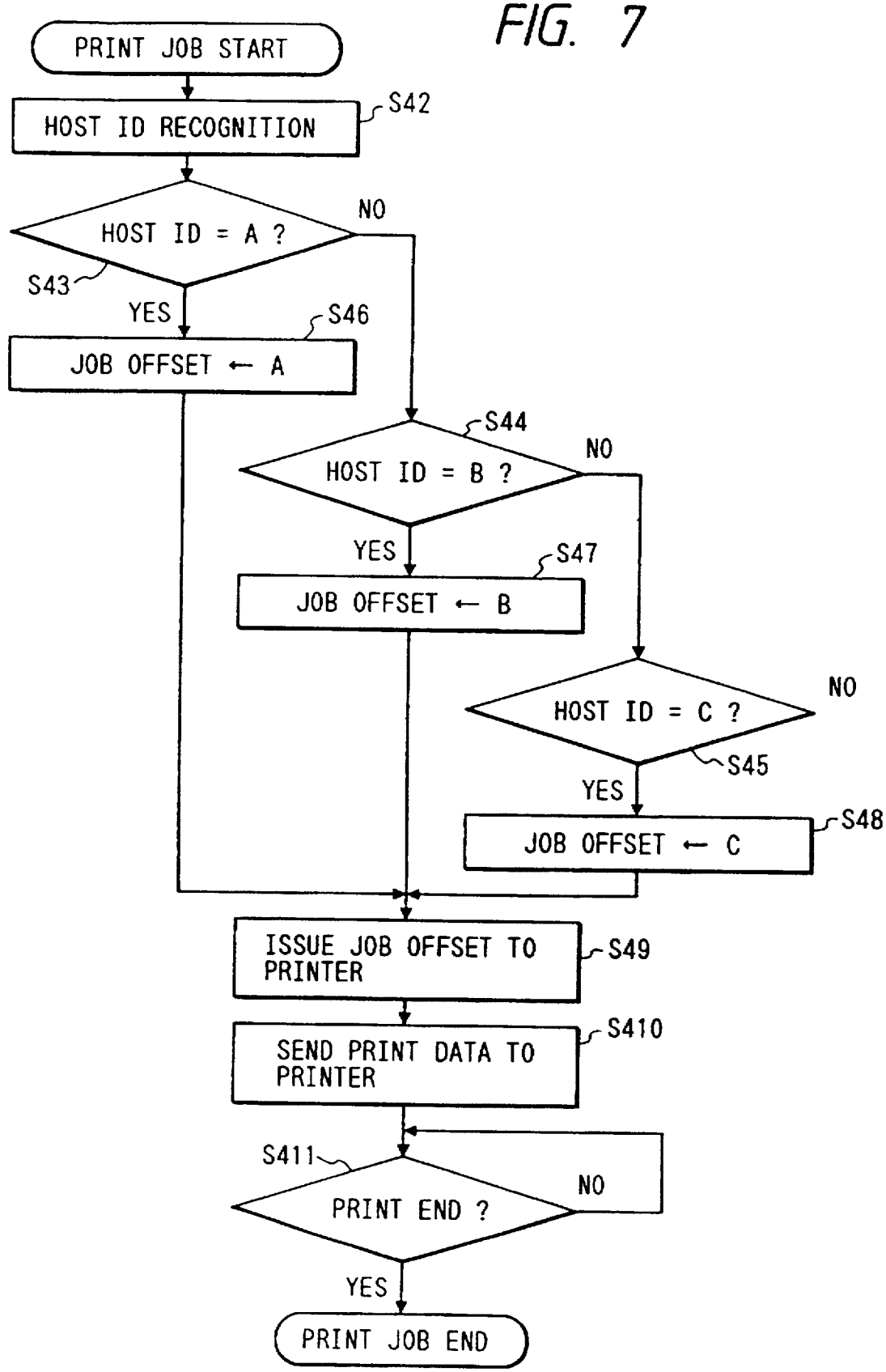
FIG. 7 is a flow chart showing a second example of the control operation of the embodiment.

FIG. 7 is a flow chart showing a second example of the control operation wherein an offset operation is performed by a printer each time a host computer is changed to another so that printing sheets for each host computer can be ejected to a different position.

First, when print data is sent from a host computer to the print buffer unite a print job starts.

A host ID of the host computer is checked (step S42). In accordance with the checked host IDs (step S43 to step S45), different job offset commands are set (step S46 to S48).

The job offset commands set in the above manner are issued to the printers (step S49), so that the printing sheet eject position for each host computer becomes different. An example of such different eject positions is like that shown in FIG. 5.

Next, print data is sent to a printer (step S410) until the end of the print job. At the end of a series of print jobs (step S411), the procedure is terminated.

Figure 8:
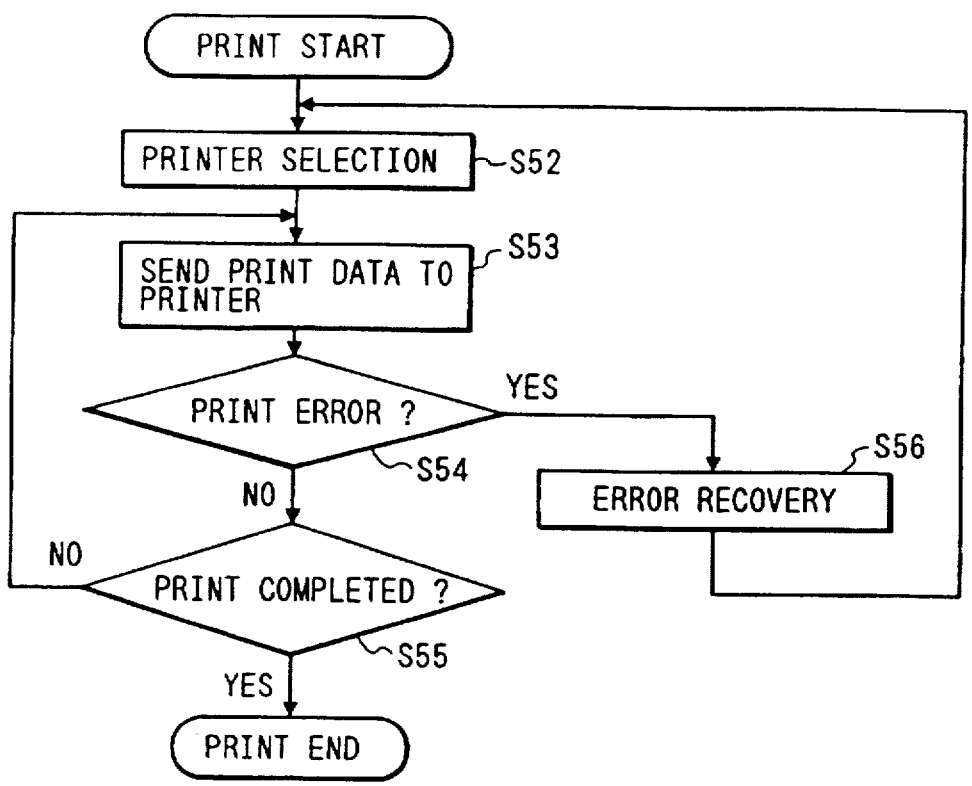
FIG. 8 is a flow chart showing a third example of the control operation of the embodiment.

FIG. 8 is a flow chart showing a third example of the control operation including an error recovery operation wherein when an error occurs at one printer during performing a print job, the printer buffer unit automatically selects another printer.

First, when print data is sent from a host computer to the print buffer unit, a print job starts.

A printer is selected to which the print data is sent from the printer buffer unit (step S52).

The print data is sent to the selected printer (step S53), and the printer is monitored if it performs a normal operation (step S54). If there is no printer error, the above steps are repeated until the print job has been completed (step S55). If an error occurs during the printing operation, an error recovery operation is performed (step S56). Namely, the control returns to step S52 to select another printer. If this selected printer can be used, the print job continues by using this printer without intercepting the printing operation, and the printing operation is terminated after the print job has been completed (step S55). In this case, documents for one print job are ejected out by two printers. Such effect may be informed to the host computers for the two printers.

Figure 9:
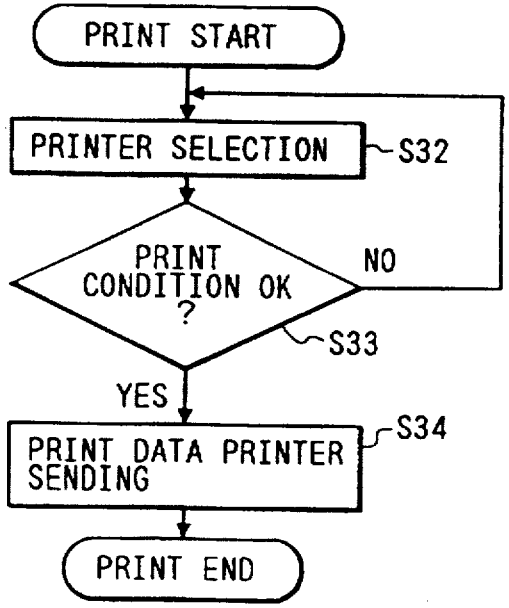
FIG. 9 is a flow chart showing a fourth example of the control operation of the embodiment

FIG. 9 is a flow chart showing a fourth example of the control operation wherein a printer suitable for a particular print job is automatically selected and print data is printed out by the selected printer.

The type of a printer to be selected depends on the size of a printing sheet, on whether it can print on both sides of a printing sheet, and on other conditions.

First, when print data is sent from a host computer to the print buffer unit, a print job starts.

A printer connected to the printer buffer unit is checked at step S62. At step S63 it is checked whether the type of the connected printer matches the conditions requested by the host computer. If affirmative, the print data is sent to the printer at step S64 and printed out until the print job has been completed.

In the above embodiments, printing sheets are ejected out to the same eject tray at different positions. If one printer has a plurality of eject trays, printing sheets may be selectively ejected out to different eject trays.

Furthermore, for realizing the function of the printer buffer unit, this function may be built in each printer without using the discrete printer buffer unit.

Still further, the above-described examples of the control operation may be used as a combination thereof or selectively used upon designating each mode.

An external storage device such as a hard disk may be provided for the printer buffer unit. In this case, a number of print jobs greater than those used with only the internal buffer memory can be processed, and a burden on a host computer can be reduced and another print job can be processed, at an earlier time.

As described above, according to the present invention, a function is provided to the printer buffer unit to issue a job offset command. Therefore, without increasing a burden on a host computer, printing sheets for each print job or host computer can be ejected out to a different position, allowing easy discrimination between different documents.

Furthermore, a function is provided to the printer buffer unit to monitor the status of a plurality of printers. Therefore, without increasing a burden on a host computer when an error occurs at a printer, it is possible to automatically change to another printer and not to intercept the print job. Still further, it is possible to print out print data by automatically selecting a printer suitable for the conditions requested by the host computer.

What is claimed is:

1. An apparatus provided between a host computer and a plurality of printers, for controlling the plurality of printers, said apparatus comprising:

first communicating means for communicating with the host computer;

second communicating means for communicating with the plurality of the printers, said second communicating means outputting print job data sent from the host computer and received through said first communicating means to one of the plurality of the printers;

means for, in a case that a print job of the print job data is interrupted in the one of the plurality of printers, outputting the print job data of the interrupted print job to another printer without retransmitting the print job data from the host computer; and means for notifying the host computer through said first communicating means that the print job is continued by the other printer, when the print job is continued by the other printer.

2. An apparatus according to claim 1, wherein said apparatus is connectable with a plurality of host computers through a common line.

3. An apparatus according to claim 2, further comprising means for determining a break of received print job data from one host computer of the plurality of host computers, wherein said first communicating means does not accept the print job data from another host computer until the break is determined by said determining means.

4. An apparatus according to claim 1, further comprising a memory for storing print job data sent from the host computer.

5. An apparatus according to claim 1, further comprising selecting means for selecting a printer, to which print job data is to be transmitted, in accordance with the print job data.

6. An apparatus according to claim 5, wherein said selecting means selects the printer based on at least one of a size of a recording sheet set in the printer and whether the printer can print on both sides of the recording sheet.

7. A method for controlling a plurality of printers communicating with a host computer, said method comprising the steps of:

communicating with the host computer using first communicating means;

communicating with the plurality of the printers using second communicating means, and outputting print job data sent from the host computer and received through the first communicating means to one of the plurality of the printers using the second communicating means;

outputting, in a case that a print job of the print job data is interrupted in the one of the plurality of printers, the print job data of the interrupted print job to another printer without retransmitting the print job data from the host computer; and notifying the host computer through the first communicating means that the print job is continued by the other printer, when the print job is continued by the other printer.

8. A method according to claim 7, wherein the plurality of printers communicate with a plurality of host computers through a common line.

9. A method according to claim 8, further comprising the step of determining a break of received print job data from a host computer of the plurality of host computers, and not accepting the print job data from another host computer until the break is determined in said determining step.

10. A method according to claim 7, further comprising the step of storing print job data sent from the host computer.

11. A method according to claim 7, further comprising the step of selecting a printer, to which print job data is to be transmitted, in accordance with the print job data.

12. A method according to claim 11, wherein in said selecting step the printer is selected based on at least one of a size of a recording sheet set in the printer and whether the printer can print on both sides of the recording sheet.

13. A system comprising:

a host computer for generating print job data;

a plurality of printers;

first communicating means for communicating with said host computer;

second communicating means for communicating with said plurality of the printers, said second communicating means outputting print job data sent from said host computer and received through said first communicating means to one of said plurality of the printers;

means for, in a case that a print job of the print job data is interrupted in the one of said plurality of printers, outputting the print job data of the interrupted print job to another printer without retransmitting the print job data from said host computer; and means for notifying said host computer through said first communicating means that the print job is continued by said other printer, when the print job is continued by said other printer.

14. A system according to claim 13, further comprising a plurality of host computers connected to a common line.

15. A system according to claim 14, further comprising means for determining a break of received print job data from one host computer of said plurality of host computers, wherein said first communicating means does not accept the print job data from another host computer until the break is determined by said determining means.

16. A system according to claim 13, further comprising a memory for storing print job data sent from said host computer.

17. A system according to claim 13, further comprising selecting means for selecting a printer, to which print job data is to be transmitted, in accordance with the print job data.

18. A system according to claim 17, wherein said selecting means selects said printer based on at least one of a size of a recording sheet set in said printer and whether said printer can print on both sides of the recording sheet.

* * * * *

UNITED STATES PATENT AND TRADEMARK OFFICE
CERTIFICATE OF CORRECTION

PATENT NO. : 5,895,155

DATED : April 20, 1999

INVENTOR(S) : IZUMI NARITA, ET AL.

It is certified that error appears in the above-identified patent and that said Letters Patent is hereby corrected as shown below:

COLUMN 1,
Line 25, "Furthermore" should read --Furthermore,--;
Line 28, "printer Therefore" should read --printer. Therefore,--;
Line 42, "one" should read --one.--;
Line 48, "pointer" should read --printer--; and
Line 61, "inventions" should read --invention,--.

COLUMN 2,
Line 4, "jobs" should read --job,--;
Line 21, "circuit." should read --circuit--;
Line 38, "embodiment" should read --embodiment.--; and
Line 47, "invention" should read --invention.--.

COLUMN 3,
Line 2, "printer" should read --printer.--;
Line 21, "1control" should read --control--; and
Line 29, "buffer 1202" should read --buffer 1202.--.

UNITED STATES PATENT AND TRADEMARK OFFICE
CERTIFICATE OF CORRECTION

PATENT NO. : 5,895,155

DATED : April 20, 1999

INVENTOR(S) : IZUMI NARITA, ET AL.

It is certified that error appears in the above-identified patent and that said Letters Patent is hereby corrected as shown below:

<u>COLUMN 3 (Cont.)</u>,
Line 33, "described" should read --described.--; and
Line 39, "unite" should read --unit,--.

<u>COLUMN 4</u>
Line 21, "unite" should read --unit,--.

<u>COLUMN 5</u>,
Line 20, "processed." should read --processed--.

Signed and Sealed this

Fourteenth Day of December, 1999

Attest:

Q. TODD DICKINSON

Attesting Officer

Acting Commissioner of Patents and Trademarks